(12) United States Patent
Raju et al.

(10) Patent No.: US 7,679,941 B2
(45) Date of Patent: Mar. 16, 2010

(54) POWER CONVERSION SYSTEM WITH GALVANICALLY ISOLATED HIGH FREQUENCY LINK

(75) Inventors: Ravisekhar Nadimpal Raju, Clifton Park, NY (US); Richard S. Zhang, Rexford, NY (US); Rajib Datta, Niskayuna, NY (US); Allen Michael Ritter, Roanoke, VA (US); Ljubisa Dragoljub Stevanovic, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 267 days.

(21) Appl. No.: 11/810,837

(22) Filed: Jun. 6, 2007

(65) Prior Publication Data

US 2008/0304300 A1    Dec. 11, 2008

(51) Int. Cl.
*H02M 5/45* (2006.01)
(52) U.S. Cl. .............................. 363/37; 363/65; 363/71
(58) Field of Classification Search .............. 363/34–44, 363/65, 72, 95, 97, 132, 98; 307/66, 105, 307/71
See application file for complete search history.

(56) References Cited

U.S. PATENT DOCUMENTS

| | | | |
|---|---|---|---|
| 3,517,300 A | 6/1970 | McMurray | 363/25 |
| 5,691,577 A * | 11/1997 | Smith | 307/105 |
| 5,943,229 A | 8/1999 | Sudhoff | 363/125 |
| 5,982,645 A * | 11/1999 | Levran et al. | 363/37 |
| 6,697,271 B2 * | 2/2004 | Corzine | 363/71 |
| 6,697,274 B2 * | 2/2004 | Bernet et al. | 363/132 |
| 6,879,062 B2 | 4/2005 | Oates | 307/140 |

FOREIGN PATENT DOCUMENTS

WO        WO 01/71897        9/2001

OTHER PUBLICATIONS

A Power Electronic-Based Distribution Transformer, Edward R. Ronan, Scott D. Sudhoff, Steven F. Glover, Dudley L. Galloway, IEEE Transactions On Power Delivery, vol. 17, No. 2., Apr. 2002.
Analysis and Design of Electronic Transformers for Electric Power Distribution System, Moonshik Kang, Prasad N. Enjeti, Ira J. Pitel, IEEE Transactions On Power Electronics, vol. 14, No. 6, Nov. 1999.
An Actively Cooled High Power, High Frequency Transformer With High Insulation Capability, Lothar Heinemann, ABB High Voltage Products, IEEE IAS Conference 2002.

(Continued)

*Primary Examiner*—Rajnikant B Patel
(74) *Attorney, Agent, or Firm*—Penny A. Clarke (57) ABSTRACT

A power conversion system has a three-phase AC input, where each AC input phase is linked to a string of cascaded single-phase AC-DC converters placed in series with a three-phase AC-DC converter. Each single-phase AC-DC converter in one embodiment includes a silicon carbide (SiC) pulse width modulated MOSFET H-bridge that placed in series with the three-phase AC-DC converter that includes a silicon (Si) SCR bridge. The single-phase AC-DC converters and the three-phase AC-DC converter together in one embodiment include a mixed silicon-carbide (SiC) and silicon (Si) device topology.

23 Claims, 5 Drawing Sheets

OTHER PUBLICATIONS

Multilevel Intelligent Universal Transformer for Medium Voltage Applications, Jih-Sheng Lai, Arindam Maitra, Arshad Mansoor, Frank Goodman, IEEE IAS Conference 2005.

Design Considerations for a Medium Frequency Transformer in a Line Side Power Conversion System, Tommy Kjellqvist, Staffan Norrga, Stefan Ostlund, IEEE Power Electronics Specialists Conference 2004.

Configurable Front-End Converters for Multicurrent Locomotives Operated on 16 2/3 Hz AC and 3 kV DC Systems, Alfred Rufer, Nikolaus Schibli, Christophe Chabert, Claudio Zimmermann, IEEE Transactions on Power Electronics, Sep. 2003.

eTransformer to Revolutionize Train Design, Article from Alstrom Website.

Alstrom's "eTransformer" Makes Trains Lighter and Frees Up Space, Innotrans 2004.

15 kV/16.7 Hz Energy Supply System with Medium Frequency Transformer and 6.5 kV IGBTs in Resonant Operation, B. Engel, M. Victor, G. Bachmann, A. Falk, EPE Conference 2003.

Medium Frequency Transformer for Traction Applications making use of Multilevel Converter: Small Scale Prototype Test Results, Mauro Carpita, Marc Pellerin, Joel Herminjard, SPEEDAM Conference 2006.

Light Transformers For Kilowatt SMPS Based On Nanocrystalline Softmagnetic Cores, M. Ferch, IEE PEVSD Conference 1998.

* cited by examiner

POWER CONVERSION SYSTEM WITH GALVANICALLY ISOLATED HIGH FREQUENCY LINK

BACKGROUND

The present invention is directed to high frequency power electronics, and more particularly to a power conversion system with a galvanically isolated high frequency link.

The low power density of conventional electrical systems has been a significant barrier to the deployment of 'more electric' systems for particular classes of ships. Improvements in power densities that are achieved by advanced turbines and generators are often diluted by the need for bulky ancillary equipment, such as transformers.

Many modern power systems require large and heavy 50 Hz or 60 Hz conventional transformers. The weight and volume of these transformers is a major barrier to the development of expanded electrical capabilities associated with certain future power system applications.

High frequency "solid state transformers", which are enhanced replacements of bulky line frequency iron core transformers have drawn considerable interest for utility distribution systems and locomotive applications. The Intelligent Universal Transformer (IUT) program launched by the Electric Power Research Institute (EPRI), and medium frequency transformer prototype demonstrations by Bombardier, ABB, and Deutsche Bahn for locomotive application, represent examples of state-of-the-art research in this area.

Architectures proposed for these electronic transformers have centered on using cascaded converter blocks or multi-level neutral point clamped (NPC) converters to handle the high voltages on the primary side.

Figure 1:
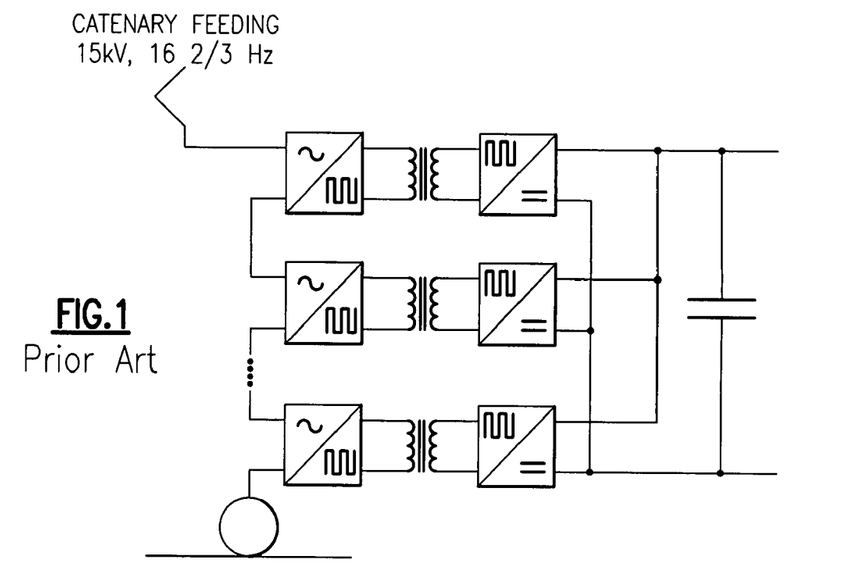
FIG. 1 illustrates an electronic transformer architecture that employs cascaded converter blocks to handle high voltages on the primary side, and that is known in the art.

FIG. 1 exemplifies the large number of cells, or levels, required in the cascaded converter block architectures. These architectures are disadvantageous in that they inherently necessitate a high level of complexity and part count. A large number of cascaded cells are required with this approach due to limited voltage ratings of available silicon (Si) semiconductors.

Figure 2:
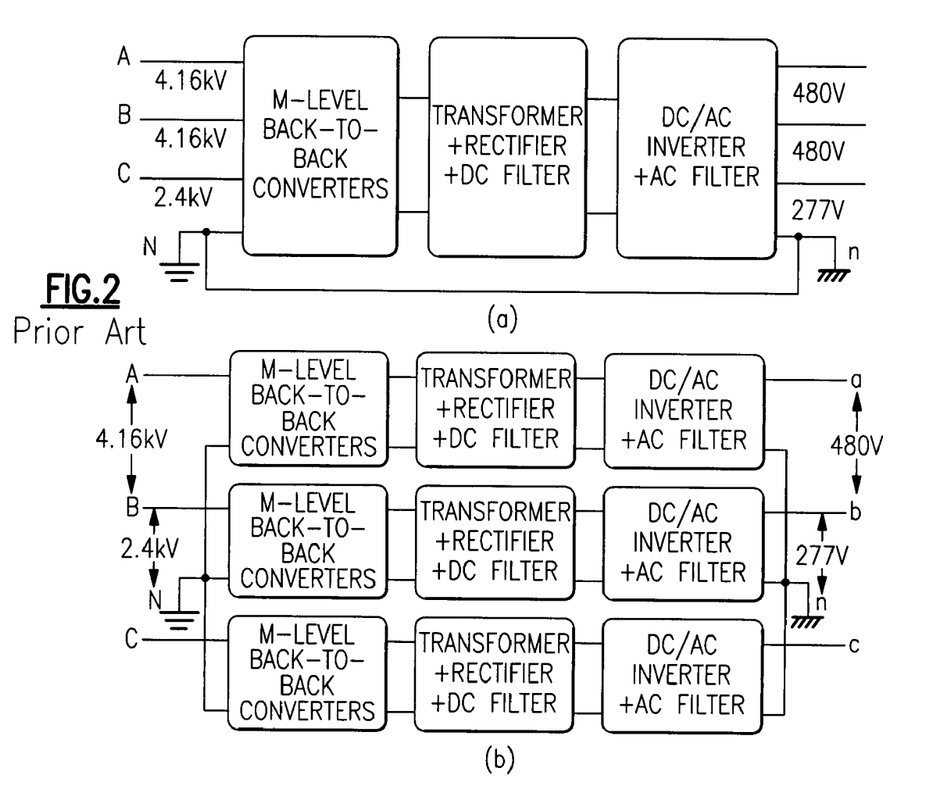
FIG. 2 illustrates an electronic transformer architecture that employs a multi-level NPC converter block architecture, and that is known in the art.

FIG. 2 exemplifies the large number of cells, or levels, required in a multi-level NPC converter block architecture. The architecture illustrated in FIG. 2 utilizes a HV-IGBT-based multi-level NPC converter configuration on the primary side. The limited voltage rating and switching frequency of current high voltage IGBTs result in a large component count and low system performance.

High power density solid-state electronics transformers for solid-state power substations (SSPS) provide functionalities beyond a conventional line frequency iron core transformer. These functionalities include: (1) step up or down voltage level with galvanic isolation between low frequency input and output, which is the function of a conventional line frequency transformer, with a much higher power density resulted from intermediate high frequency isolation transformer; (2) ability to convert frequency, e.g. get DC or 60 Hz or 400 Hz power at the output from 50 Hz or 60 Hz input power; (3) generate multiple outputs at different frequencies and voltage levels; and (4) provide advanced control functions for entire power system, such as reactive power compensation, voltage regulation, and active harmonic filtering, active damping etc.

Emerging silicon carbide (SiC) devices, e.g. SiC MOSFET, SiC IGBT, SiC Schottky, PiN and JBS diodes, etc. offer application benefits, such as lower conduction and switching losses, higher voltage and higher temperature capabilities than their counterparts of Si devices. Those features are critical to enable high density high frequency, medium voltage SSPS. However, at present state those SiC devices have a manufacturing yield that is lower than Si devices, and a cost that is higher than Si devices. Significant challenges remain to developing such a smaller solid-state electronics transformer for a solid-state power substation (SSPS). These include, but are not limited to:

Conventional high power converter topologies, such as multi-level NPC converters, present significant design challenges at high frequencies due to complex device interconnections and packaging. Parasitic inductances can lead to increased electrical stresses and degradation of performance;

Thermal management of high frequency transformers is a major challenge due to their reduced size;

Passive components, such as DC bus capacitors, input and output filters, and contactors can limit power densities. Minimizing the use of such devices is critical;

Multiple cascaded power conversion stages can reduce the SSPS efficiency; and

Device count should be minimized to account for yield constraints of early SiC devices.

In view of the foregoing, it would be both advantageous and beneficial to provide a fault tolerant, high frequency link-based transformer (i.e. solid-state power substation (SSPS)) including controls to minimize all passive components associated with the SSPS. It would be further beneficial if the SSPS architecture could be implemented using well-understood power blocks with a parts count that is lower than that achievable when using known electronic transformer architectures.

BRIEF DESCRIPTION

The present invention is directed to a power conversion system having a three-phase AC input, where each AC input phase is linked to a string of cascaded single-phase AC-DC converters placed in series with a three-phase AC-DC converter. Each single-phase AC-DC converter in one embodiment includes a silicon carbide (SiC) pulse width modulated MOSFET H-bridge that is placed in series with the three-phase AC-DC converter that includes a silicon (Si) SCR bridge. The single-phase AC-DC converters and the three-phase AC-DC converter together in one embodiment include a mixed silicon-carbide (SiC) and silicon (Si) device topology.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 3:
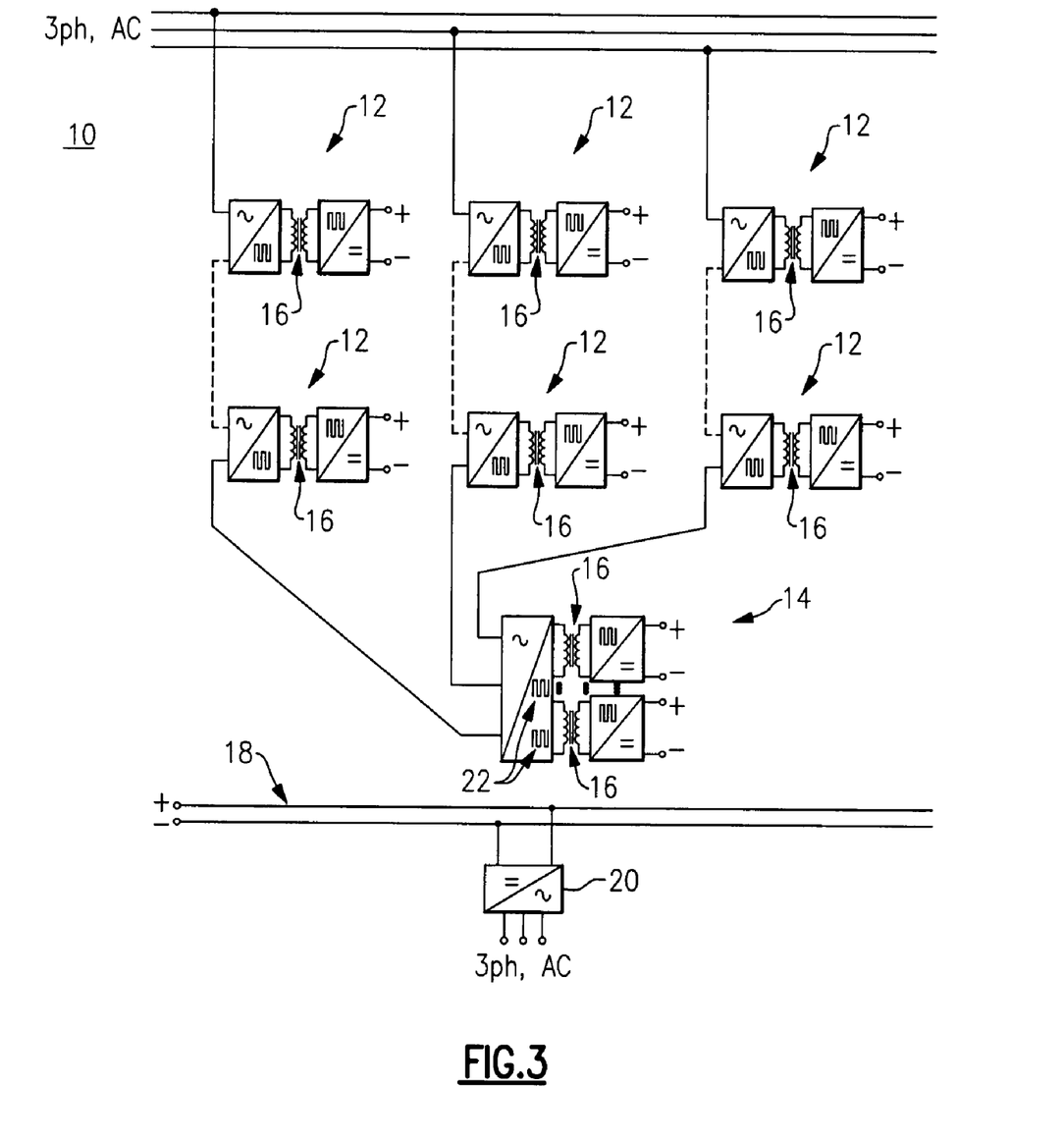
FIG. 3 illustrates a power conversion system with galvanically isolated high frequency links according to one embodiment of the present invention.
Figure 4:
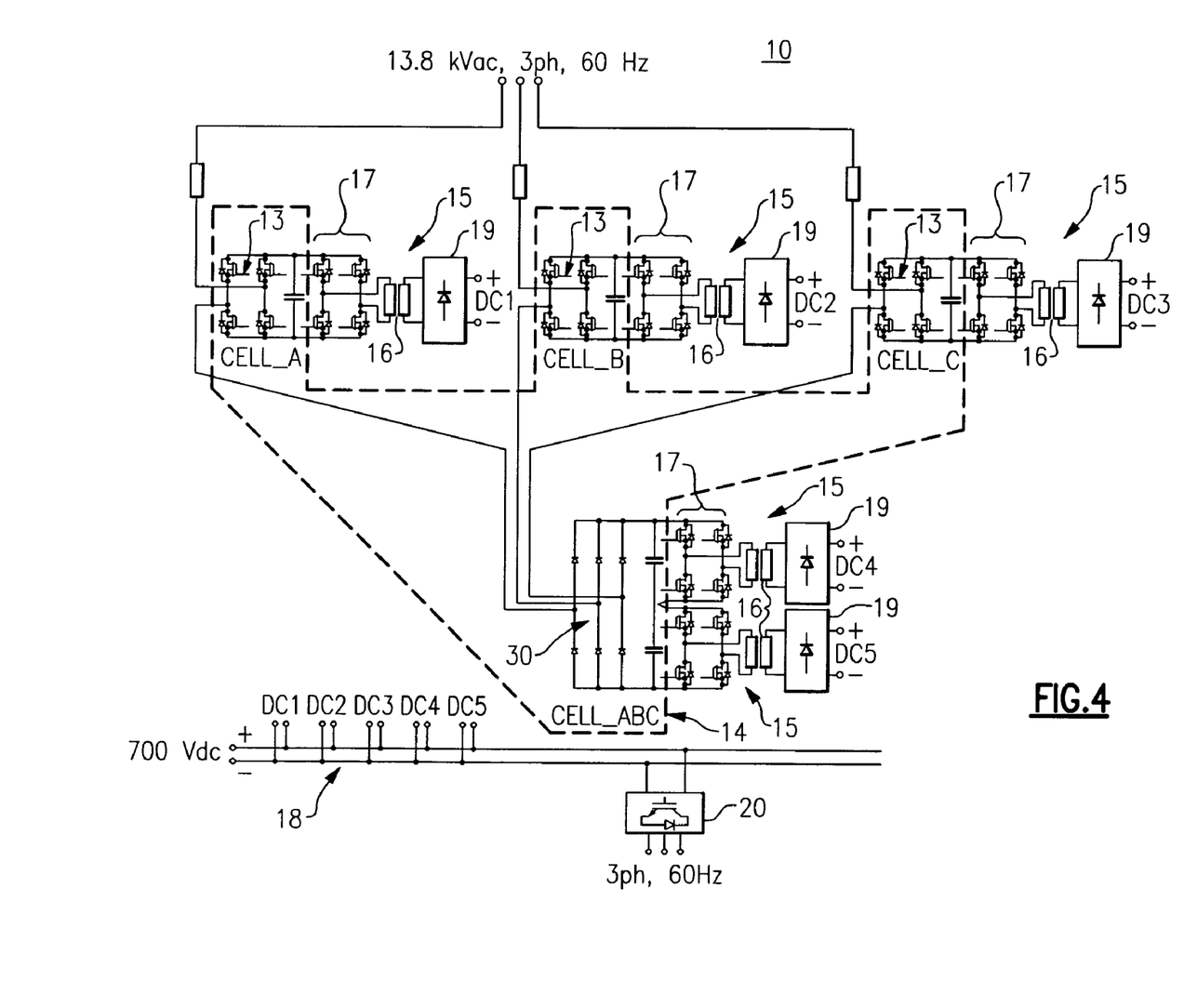
FIG. 4 is a more detailed diagram of the power conversion system depicted in FIG. 3 according to one embodiment.

FIG. 3 illustrates a power conversion system (e.g. solid-state power substation (SSPS)) 10 with galvanically isolated high frequency links according to one embodiment of the present invention. The power conversion system 10 in one embodiment employs a hybrid (a mixed three-phase and single phase topology coupled with mixed SiC and Si devices) AC-DC stage that includes a plurality of single-phase AC-DC converters 12, and a three-phase AC-DC converter 14, to provide an advanced replacement for a conventional iron core transformer. A more detailed diagram of power conversion system 10 is illustrated in FIG. 4. The power conversion system 10 is based upon 1) rectification of high voltage AC to high voltage DC links by using an Si SCR or diode bridge 30 combined with SiC MOSFET H-bridges 17; 2) modular SiC MOSFET H-bridge DC-DC converters (enumerated 15 in FIG. 4) inverting the high voltage DC links to high frequency AC links prior to rectification; 3) modular high frequency transformers 16 coupled to the high frequency AC links; 4) voltage rectifiers (enumerated 19 in FIG. 4) at the secondary side of the high frequency transformers 16 to create a common DC bus 18; and 5) output power block(s) 20 to construct a three-phase AC output signal.

The outputs of these AC-DC power converters 12, 14 can be placed in parallel to provide a fault tolerant DC bus 18, as shown in FIG. 3. The present invention is not so limited however, and it shall be understood that the power conversion system 10 can provide numerous combinations of output voltages and types of output voltages, depending only on where the output voltage is generated by the power conversion system 10. Different DC voltages can be generated, for example, by changing the turns ratio of one or more transformers 16. Direct AC inversion can be used to generate single-phase AC voltage, which results from a sinusoidal high frequency modulated waveform at the transformer 16 and filtering action with leakage inductance of the high frequency transformer (and/or with additional inductance) and the DC link capacitor of the direct AC inverter described herein below with reference to FIG. 5. The low frequency modulated, e.g. half sinusoidal DC voltage at the DC link 18 of the direct AC inverter is unfolded to obtain the ultimate low frequency AC output. Three-phase AC voltage can be obtained with three sets of the circuit depicted in FIG. 5. Mixed multiple types of outputs (DC only, DC w/60 Hz w/400 Hz outputs, . . . , etc.) can thus be provided using the techniques described above.

The AC-DC hybrid topology in one embodiment has a modular redundancy and fault tolerance capability. If one of the AC-DC converter SiC PWM bridges 13 fails, it will be bypassed and the corresponding DC-DC converter 15 isolated. The dc bus voltages in the healthy bridges can be raised sufficiently so that adequate modulation margin is maintained. This will allow the healthy bridges to maintain control of the current flow into the SSPS from the input side. Balanced three-phase input power with high power quality can still be achieved. In case of failure of an individual SCR in the 3-phase SCR rectifier, the rectifier can continue to operate in a balanced manner since the design can use redundant SCR cells in series.

The three-phase AC-DC converter 14 in one embodiment includes a single Si SCR or diode based three-phase bridge rectifier 30 in stack with one SiC PWM H-bridge 13 per phase. The SCR bridge 30 operates with two split DC busses and presents a high voltage square wave at its input terminals.

The single phase H-bridges 13 (Cell_A, Cell_B and Cell_C in FIG. 4) in each single-phase AC-DC converter 12 inherently draw ripple power at two times input AC frequency, as stated herein before. DC-DC converters 15 in one embodiment are controlled to pass the ripple power to the DC bus 18 in order to minimize the DC link capacitance of those single-phase H-bridges 13 in the DC-DC converters 15. The ripple power will be canceled when the individual outputs from the three phases are combined at the DC bus 18. This is advantageous over known conventional approaches using three single-phase power stages for a three-phase SSPS since such conventional approaches generally require very large high voltage DC link capacitors.

The Si SCR or diode bridge rectifier 30 in one embodiment is used to process the bulk of the input power, while providing benefits such as higher efficiency and reliability. Fast switching SiC devices in one embodiment are used in two-level H-bridges 13 placed in series with the Si SCR bridge 30 to provide waveform shaping and current regulation. This architecture was found by the present inventors to minimize the number of SiC devices required to implement medium voltage AC-DC conversion in the power conversion system 10. Additional components such as inrush current limiters are minimized since the SCR bridge provides a soft-start capability. The switching frequency of the SiC H-bridges 13 in one embodiment is optimized to maintain high power quality and maximize efficiency.

Under operating conditions in which a particular electrical system has a sufficiently large system impedance, this system impedance can be utilized as the input inductance for the AC-DC converters 12, 14. Under such conditions, minimal or no additional input inductors are necessary to accommodate desired operation of the power conversion system 10; and thus, power conversion system 10 power density and efficiency are increased to desired levels.

Although SiC MOSFETs must be switched at a high frequency to enable the use of a high density transformer 16 in the DC-DC converter 15, the power switches in the AC-DC converters 12, 14 are switched at a lower frequency to balance high power quality and high efficiency. Since each AC-DC converter 12, 14 front end processes power at the line frequency, it is not necessary to use all high switching frequency SiC devices in order to achieve high power quality and meet requisite standards.

The SiC H-bridges 13 operate, according to one embodiment, with nominal DC link voltages and provide input current regulation and waveform conditioning in addition to transferring power to their associated DC-DC converters 15. The DC bus voltages are raised up, in one embodiment, to a high voltage during high line or fault mode redundant operation. To maintain adequate control of the SSPS AC input current, the DC bus voltages of the input bridges must be sufficiently high to counter the AC line voltage and to preserve control modulation range. By raising the DC bus voltages during high input AC line voltages, this requirement can be satisfied.

Figure 5:
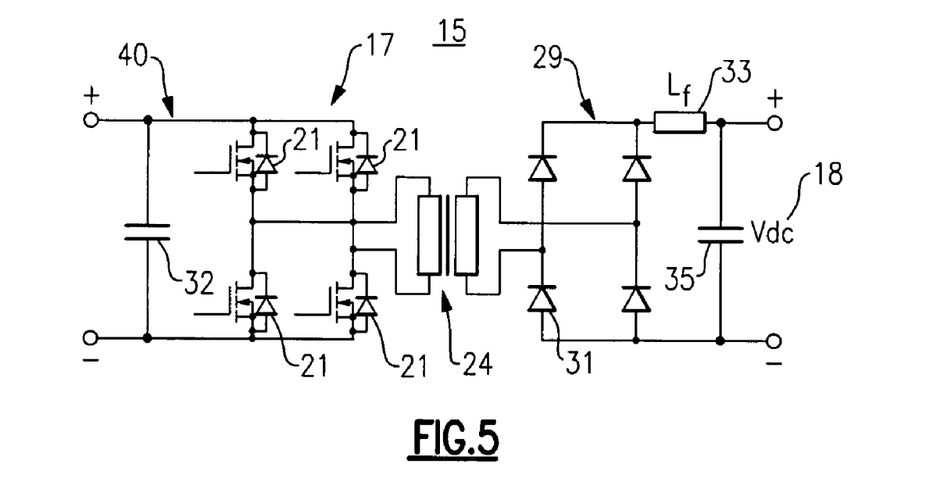
FIG. 5 is a schematic diagram illustrating in more detail a single DC-DC converter architecture suitable for use with the power conversion system shown in FIG. 3 according to one embodiment.

FIG. 5 is a schematic diagram illustrating in more detail, a single DC-DC converter 15. Each DC-DC converter 15 includes a SiC MOSFET full bridge 17 coupled to a Si or SiC diode bridge 29 through a high frequency galvanic isolation transformer 16. The transformer 16 outputs are rectified via a set of Si fast recovery diodes 31 or SiC Schottky diodes, and then filtered via a reactor/inductor 33 and a filter capacitor 35 to provide a constant DC voltage output. Modular DC-DC converters 15 in one embodiment use the same type of SiC MOSFET H-bridges 17 as those H-bridges 13 employed in the AC-DC converters. This simple H-bridge building block was found by the present inventors to enable a topology having minimized commutation loops and parasitic inductance. These features can be important since tight packaging and integration of the modules provides for high frequency operation with minimized electrical and EMI stresses.

The H-bridge based DC-DC converters 15 can be readily adapted for phase-shifted soft-switching if MOSFET and antiparallel diode 21 switching losses prove to be unacceptable with hard-switched operation. Multi-level NPC converters would require significant modifications to accommodate such soft-switched operation, and thus are disadvantageous when compared with the H-bridge based DC-DC converters 15. The phase-shifting technique employed exploits parasitic circuit elements, such as device capacitances, to provide low-loss switching transitions without the need for additional components. Suitable phase-shifting techniques are widely used in commercial DC-DC power supplies, and so phase-shifting techniques will not be discussed in detail herein.

The modular DC-DC converters 15 also advantageously lead to the use of modular high frequency transformers. This feature allows easier procurement and manufacturing of high frequency magnetic cores because processing of high frequency and high power magnetic cores, such as nanocrystalline material, for large cores is a significant challenge.

The foregoing modular high frequency galvanic isolation transformers 16 can have higher power density than a single transformer solution due to distributed thermal management and less insulation requirements.

Ripple power at two times AC input frequency drawn by a SiC H-bridge 13 in a single-phase AC-DC converter 12 flows through a corresponding DC-DC converter 15 without having to buffer the ripple power on the high voltage DC bus. The DC link capacitor 35 size and weight can therefore be dramatically reduced.

The modular DC-DC converters 15 can be controlled in an interleaved fashion by interleaving multiple threads to minimize switching frequency ripple and thus the size and weight of the output filter devices 33, 35. This thread interleaving advantageously minimizes the output filter size requirements for the DC bus 18.

Further, phase shifting PWM techniques associated with the DC-DC converters are implemented to achieve soft switching, reduced EMI, and high performance. This can be achieved, for example, by operating each full bridge 17 as a phase shifted PWM, soft-switching PWM bridge. Interleaving and phase shifting PWM techniques are well known in the power electronics arts, and so are not discussed in further detail herein to preserve brevity and enhance clarity.

Those skilled in the diode art will understand that losses due to reverse recovery of body diodes in MOSFET and antiparallel diodes (PiN or JBS) can be significant. The SiC MOSFETs may be operated in a synchronous rectifier mode to further improve their efficiency. Operating the SiC MOSFETs in a synchronous rectifier mode will alleviate the necessity to employ antiparallel diodes in the SiC modules.

The galvanic isolation transformers 16 can employ high frequency magnetic material, such as nanocrystalline, and employ processing and cutting techniques to optimize the magnetic core with reduced size and weight. Advanced winding design and assembly techniques can be employed to maximize efficiency and reduce electric field stresses and partial discharge effects. Winding spacing and insulating materials can be selected to significantly raise transformer self-resonant frequencies above the operational excitation frequency.

The power conversion system 10 topology described herein provides superior size, weight and efficiency compared to other approaches, as described herein before. The present inventors also recognized system efficiency can be further improved by using SiC-based devices for the low voltage rectifier and inverter bridges.

Partial load efficiency of the power conversion system 10 will not degrade significantly because 1) individual DC-DC converter bridges 17 and associated high frequency transformers 16 can be shut down at reduced loads; 2) switching and conduction losses increase more than linearly with current levels (i.e. at lower current levels, the device efficiencies are better); and 3) cooling pumps/fans can be activated intelligently based on thermal demands to maximize efficiency.

The power conversion system 10 may optionally include a liquid cooling circuit for the main power modules, with the high frequency galvanic isolation transformers 16 being forced-air cooled. A liquid-to-liquid heat exchanger is suitable to transfer losses to an external water supply. Such liquid cooling circuits are well known, and so are not discussed in further detail herein.

Figure 6:
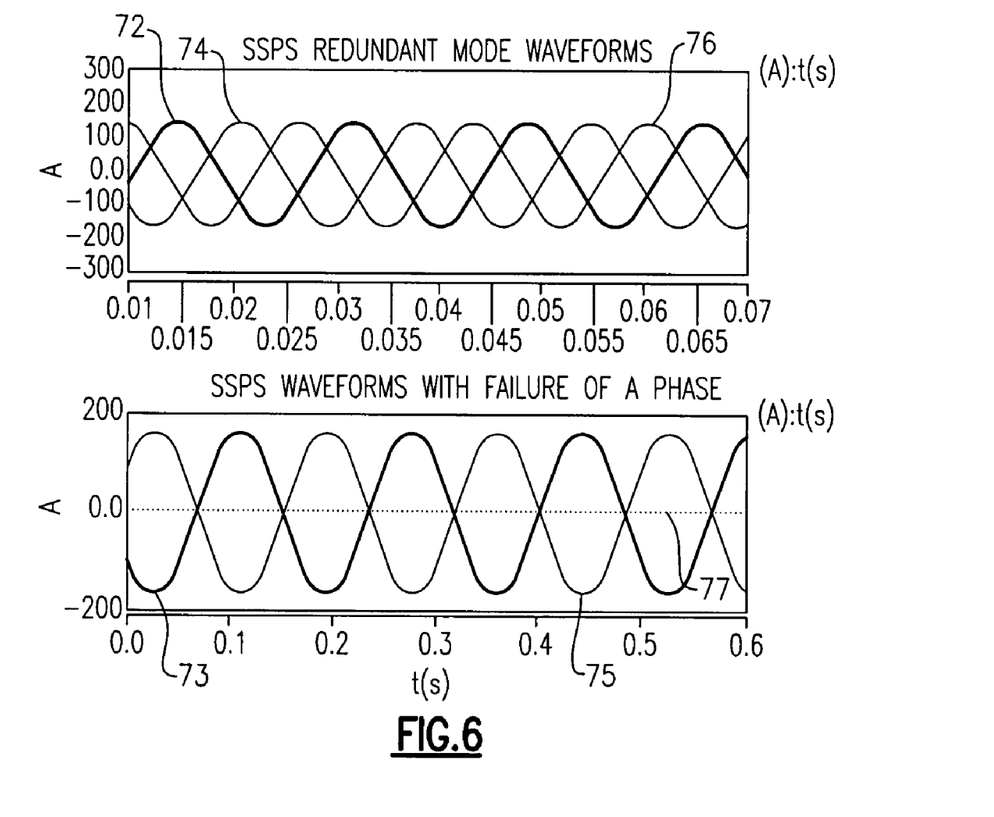
FIG. 6 illustrates line current waveforms for two alternative operating modes when a SiC power block (e.g., Cell_A or Cell_ABC in FIG. 4) fails.

FIG. 6 illustrates line current waveforms for two alternative operating modes when a single AC-DC converter 12 fails. The top waveforms show the failed AC-DC converter 12 bypassed and the bottom waveforms show the power conversion system 10 is powered by two remaining phases. In both cases, full voltage and current are maintained at the expense of degraded, but still within acceptable harmonic distortion specifications. The AC-DC converter SCR bridge 30 in one embodiment is built with redundant series devices; so if an SCR fails, there is enough redundancy to continue operating with no impact on power conversion system 10 performance. Numerals 72, 74 and 76 depict line currents C, A, B respectively; and numerals 73, 75 and 77 depict line currents B, C and A respectively.

Although bidirectional power flow is not implemented in the power conversion system 10 described herein before, such bidirectional power flow can be readily added by placing antiparallel Si switches, such as IGCTs or IGBTs, across the SCRs in the rectifier. The high efficiency and robustness of the power conversion system 10 would be retained with this modification.

Additional output power block(s) for generating three-phase AC can also be employed to work in association with the power conversion system 10. Two approaches can be used to implement the requisite power block(s). These include 1) high frequency direct AC inversion at the secondary side of the galvanic isolation transformer 16; or 2) DC to AC inversion 20 at the DC bus 18.

Figure 7:
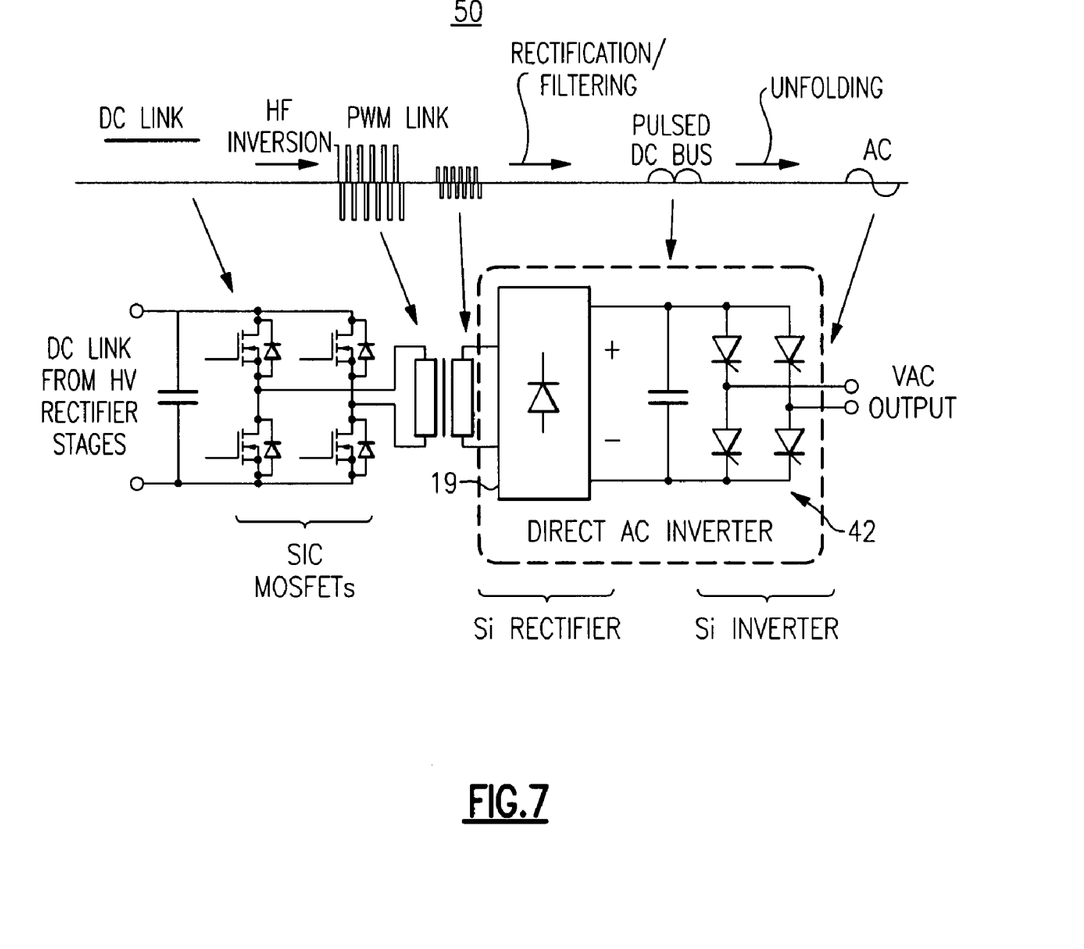
FIG. 7 illustrates a high frequency direct AC inverter system that can be employed to implement the optional DC-AC power block depicted in FIG. 3 according to one embodiment.

FIG. 7 illustrates a high frequency direct AC inverter 50 that can be employed to implement high frequency direct AC inversion by using the SiC H-bridge 17 in a DC-DC converter 15. The SiC H-bridge 17 in the DC-DC converter 15 is controlled to provide sinusoidal modulated high frequency AC waveforms at the primary side of the transformer 16, which is then filtered with leakage inductance of the high frequency transformer (and/or with additional inductance) and the DC link capacitor of the direct AC inverter. The low frequency modulated, e.g. half sinusoidal, DC voltage at the DC link of the direct AC inverter is unfolded with a Si full bridge 42 to provide the desired AC output. Three-phase AC voltage can be provided with three sets of the circuit.

An alternative approach for generating three-phase AC includes inverting the DC to AC at the DC output bus 18 as shown in FIG. 3. The present inventors discovered the switching frequency is typically limited to less than 5 kHz for this approach when using state-of-the-art power device technology. High output power quality for this approach requires a bulky passive filter, which disadvantageously increases power density requirement in many applications. This approach for generating three-phase AC output power is believed to be desirable only when DC intermediate bus architectures are employed.

In summary explanation, a power conversion system (e.g. solid-state power substation) 10 with galvanically isolated high frequency links has been described as using standard modules that employ a parts count that is lower than that achievable using known alternative topologies. The power conversion system 10 employs hybrid (mixed three-phase and single phase topology coupled with mixed SiC and Si devices) AC-DC stages 12, 14 and a modular DC-DC stage 15 to provide an enhanced replacement for a conventional iron core transformer. In one embodiment, the power conversion system 10 is one-tenth of the weight and one-third the size of a conventional transformer, while maintaining comparable high efficiency and enhancing functionality and power quality. The power conversion system 10 further provides very high reliability and fault tolerant operation due to modular redundancy.

The power conversion system 10 includes a plurality of single-phase AC-DC converters 12, a three-phase AC-DC converter 14, and a plurality of DC-DC converters 15 having galvanic isolation. Each AC-DC converter 12 includes a silicon carbide (SiC) MOSFET single-phase H-bridge 13 stacked with a three-phase silicon (Si) SCR bridge 30 included within three-phase AC-DC converter 14. This topology was found to achieve an optimal efficiency and power density with very high quality when integrated with particular power systems.

Each DC-DC converter 15 includes a modular phase shifted PWM, soft-switched PWM SiC MOSFET H-bridge 17, each coupled to its own high-voltage DC bus from a corresponding AC-DC converter 12. In one embodiment, each DC-DC converter 15 converts a high voltage DC link voltage to a common low to medium DC voltage through an associated high frequency galvanic isolation transformer 16 and low voltage rectifier. The modular DC-DC converters 15 in one embodiment are controlled in a way that (a) input ripple power at two times AC input frequency from the SiC H-bridges 13 in each phase of the AC-DC stage is canceled at a common low to medium voltage DC bus to minimize high-voltage DC link capacitance; and (b) converter thread interleaving cancels the switching frequency ripple so that the output filter for the common DC voltage bus 18 can be minimized.

Another embodiment employs direct AC inversion to produce three-phase AC from the high frequency link resulting in maximum power density and efficiency.

Many features of the power conversion system 10 described in detail herein before, are summarized herein below, wherein one embodiment is based on two-level SiC MOSFET bridges 13 to provide minimized high-voltage DC bus capacitor sizes. The size of the high-voltage DC bus capacitors is drastically reduced through a control technique that passes ripple power at two time AC input frequency from the single-phase blocks to a common DC output bus, as described herein before.

One embodiment of the power conversion system 10 is based on two-level SiC MOSFET bridges 13 to provide minimized DC-DC output filters. The modular DC-DC converter threads can be interleaved to cancel switching frequency ripple.

Another embodiment of the power conversion system 10 is based on two-level SiC MOSFET bridges 13 to provide minimized auxiliary components. The inrush current limiters with substantial weight and size that are necessary in other approaches are not needed in the power conversion system 10, since the SCR bridge 30 provides an inherent soft-start capability.

Yet another embodiment of the power conversion system 10 is based on two-level SiC MOSFET bridges 13 to provide minimized AC-DC converter input filters. The impedance associated with a particular electric power system is utilized to limit the input current harmonics to acceptable levels.

Still another embodiment of the power conversion system 10 is based on two-level SiC MOSFET bridges 13, and employs distributed high frequency transformers 16 rather than a single transformer, to allow better thermal management to reduce insulation requirements.

Still another embodiment of the power conversion system 10 includes a hybrid Si and SiC AC-DC converter stage 12, 14 that takes advantage of the low losses of Si SCR rectifiers.

Still another embodiment of the power conversion system 10 is based on two-level SiC MOSFET bridges 13 in which an optimized SiC switching frequency in an AC-DC converter 12 achieves both a high power quality and a low switching loss.

Still another embodiment of the power conversion system 10 is based on two-level SiC MOSFET bridges 17 in which soft-switching of DC-DC converters 15 is achieved through phase shifted soft-switching PWM H-bridges 17.

Still another embodiment of the power conversion system 10 is based on two-level SiC MOSFET bridges 17 in which synchronous rectifier operation of SiC MOSFETs may reduce reverse recovery losses of antiparallel diodes.

Still another embodiment of the power conversion system 10 is based on two-level SiC MOSFET bridges 13, 17 in which the optimum power conversion system topology requires only 16 10 kV half-bridge SiC MOSFET modules to handle a 13.8 kV ac system input voltage. This number is approximately half the number of SiC devices required for a four-level NPC topology.

Still another embodiment of the power conversion system 10 is based on two-level SiC MOSFET bridges 13 in which the power conversion system 10 will continue to provide rated voltage with substantial power capability following failure of any SiC half bridge. The power conversion system 10 will also revert to a robust six-pulse transformer-rectifier mode following failure of multiple SiC half bridges in the AC-DC converters 12 during which the power conversion system 10 could continue to provide a full voltage with substantial power capability.

Still another embodiment of the power conversion system 10 is based on two-level SiC MOSFET bridges 13 in which the power conversion system 10 is subjected to low device electrical and EMI stresses. Much simpler packaging of two-level SiC power blocks allows for low inductance buswork and reduced dv/dt levels.

Still another embodiment of the power conversion system 10 is based on two-level SiC MOSFET bridges 13 that avoid additional high voltage PiN diode modules. The need for neutral clamp PiN diodes for neutral point clamped (NPC) circuit is completely eliminated due to a modular standard two-level topology.

Still another embodiment of the power conversion system 10 is based on two-level SiC MOSFET bridges 13 having reduced half-bridge module voltage creepage and strike requirements. Voltage across terminals of SiC MOSFET half-bridge modules will not exceed the DC bus in a two-level bridge. Half-bridge SiC modules associated with multi-level NPC topologies however, require insulation capabilities approaching high voltage limits (i.e. 20 kV for a 13.8 kV ac system) leading to thermal, reliability and packaging issues.

Still another embodiment of the power conversion system 10 is based on two-level SiC MOSFET bridges 13 having simplified packaging and thermal management. Packaging and thermal management are much simpler for a standard two-level power block when compared with a multi-level NPC topology.

Still another embodiment of the power conversion system 10 is based on two-level SiC MOSFET bridges 13 to achieve the lowest weight and size and highest efficiency by exploiting SiC MOSFET fast switching capabilities, high-frequency, high-power transformers, advanced topologies and controls to achieve maximum efficiency and system reliability, and advanced controls to minimize passive components in every location.

While the invention has been described with reference to a preferred embodiment, it will be understood by those skilled in the art that various changes may be made and equivalents may be substituted for elements thereof without departing from the scope of the invention. For example, although particular embodiments were described using SiC devices, power conversion system 10 can be adapted to use alternative SiC devices, such as GTOs. Further, the power conversion system 10 can be implemented using silicon IGBTs, albeit at lower performance levels. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A power conversion system comprising a three-phase AC input, each AC input phase being linked to a string of cascaded single-phase H-bridge converters placed in series with a three-phase AC-DC converter.

2. The power conversion system according to claim 1, wherein each single-phase converter or three-phase converter comprises two-level or multi-level phase legs.

3. The power conversion system according to claim 2, wherein the multi-level phase legs are neutral point clamped or flying capacitor based.

4. The power conversion system according to claim 1, wherein DC outputs from the single-phase and three-phase AC-DC converters are coupled to modular DC-DC switch-mode converters with galvanic isolation.

5. The power conversion system according to claim 4, wherein outputs of the modular DC-DC switch-mode converters with galvanic isolation are connected to a common DC output bus.

6. The power conversion system according to claim 5, wherein the common DC output bus is connected to a DC-AC converter, such that the power conversion system serves as a transformer-like AC-AC converter with galvanic isolation.

7. The power conversion system according to claim 5, wherein the transformer-like AC-AC converter operates as a solid-state transformer or a power electronic transformer.

8. The power conversion system according to claim 4, wherein outputs of the modular DC-DC switch-mode converters with galvanic isolation are configured to provide multiple separately regulated DC outputs.

9. The power conversion system according to claim 4, wherein outputs of the modular DC-DC switch-mode converters with galvanic isolation are inverted to provide AC outputs.

10. The power conversion system according to claim 2, wherein outputs of the modular DC-DC switch-mode converters with galvanic isolation operate to provide multiple separately regulated DC outputs and single-phase or three-phase AC outputs at same or different frequencies to supply multiple load types.

11. The power conversion system according to claim 1, wherein the three-phase AC-DC converter comprises a passive rectifier bridge.

12. The power conversion system according to claim 11, wherein the passive rectifier bridge comprises a plurality of diodes.

13. The power conversion system according to claim 11, wherein the passive rectifier bridge comprises a plurality of silicon controlled rectifiers (SCRs).

14. The power conversion system according to claim 13, wherein SCRs in the passive rectifier bridge operate to limit inrush current during startup.

15. The power conversion system according to claim 1, wherein each single-phase AC-DC converter is configured to use pulse-width-modulated active rectification to allow control of its input AC current waveform.

16. The power conversion system according to claim 1, wherein any one of the single-phase AC-DC converters is bypassed or isolated at its AC input side for faults in the respective AC-DC converter or faults located downstream from the respective AC-DC converter, with controls of the remaining AC-DC converters within the string of AC-DC converters readjusted to allow continued power conversion system operation in the absence of the faulted AC-DC converter.

17. The power conversion system according to claim 1, wherein devices within the AC-DC converters comprise silicon semiconductors or silicon-carbide semiconductors configured for high frequency or high temperature operation.

18. The power conversion system according to claim 1, wherein the three-phase AC-DC converter is configured with active power devices to allow bidirectional power flow.

19. The power conversion system according to claim 18, wherein the active power device are configured within the cascaded single-phase H-bridge and in the three-phase bridge to switch at different frequencies to achieve a desired power quality and efficiency.

20. A power conversion system comprising a three-phase AC input, each AC input phase being linked to a string of cascaded single-phase AC-DC converters comprising a silicon carbide (SiC) pulse width modulated MOSFET H-bridge placed in series with a three-phase AC-DC converter comprising a silicon (Si) SCR bridge.

21. The power conversion system according to claim 20, wherein DC outputs from the single-phase and three-phase AC-DC converters are coupled to modular DC-DC switch-mode converters with galvanic isolation, and wherein the modular DC-DC switch-mode converters including rectifiers comprise a mixed SiC and Si device topology.

22. A power conversion system comprising a three-phase AC input, each AC input phase being linked to a string of cascaded single-phase AC-DC converters placed in series with a three-phase AC-DC converter, wherein the single-phase AC-DC converters and the three-phase AC-DC converter together comprise a mixed silicon-carbide (SiC) and silicon (Si) device topology.

23. The power conversion system according to claim 22, wherein DC outputs from the single-phase and three-phase AC-DC converters are coupled to modular DC-DC switch-mode converters with galvanic isolation, and wherein the modular DC-DC switch-mode converters including rectifiers comprise a mixed SiC and Si device topology.

* * * * *

UNITED STATES PATENT AND TRADEMARK OFFICE
CERTIFICATE OF CORRECTION

PATENT NO. : 7,679,941 B2
APPLICATION NO. : 11/810837
DATED : March 16, 2010
INVENTOR(S) : Raju et al.

It is certified that error appears in the above-identified patent and that said Letters Patent is hereby corrected as shown below:

On the Title Page, Item (75), under "Inventors", in Line 1, delete "Nadimpal" and insert -- Nadimpalli --, therefor.

Signed and Sealed this

Fourteenth Day of December, 2010

David J. Kappos
*Director of the United States Patent and Trademark Office*